(12) United States Patent  (10) Patent No.: US 6,299,194 B1
Chen  (45) Date of Patent: Oct. 9, 2001

(54) FOLDABLE STROLLER

(76) Inventor: Chin-Chiao Chen, No. 1146, Chung-Shan Rd., Ta-Chia Chen, Taichung Hsien (TW)

( * ) Notice: Subject to any disclaimer, the term of this patent is extended or adjusted under 35 U.S.C. 154(b) by 0 days.

(21) Appl. No.: 09/584,476

(22) Filed: Jun. 1, 2000

(51) Int. Cl.$^7$ .................................................... B62B 7/06
(52) U.S. Cl. ...................... 280/642; 280/650; 280/47.38; 280/62; 297/46; 403/83
(58) Field of Search .............................. 16/110.1; 403/83, 403/119; 297/46, 47; 280/641, 642, 644, 647, 650, 62, 47.38, 47.4

(56) References Cited

U.S. PATENT DOCUMENTS

| | | | | |
|---|---|---|---|---|
| 5,622,377 | * | 4/1997 | Shamie | 280/642 |
| 5,775,718 | * | 7/1998 | Huang | 280/647 |
| 5,823,564 | * | 10/1998 | Kettler | 280/642 |
| 5,845,924 | * | 12/1998 | Huang | 280/642 |
| 5,876,057 | * | 3/1999 | Huang | 280/642 |
| 5,938,229 | * | 8/1999 | Chen et al. | 280/47.38 |
| 5,979,928 | * | 11/1999 | Kuo et al. | 280/642 |
| 6,036,221 | * | 3/2000 | Yang | 280/642 |
| 6,062,587 | * | 5/2000 | Cabagnero | 280/650 |
| 6,073,957 | * | 6/2000 | Lan | 280/642 |
| 6,116,624 | * | 9/2000 | Hu | 280/642 |

* cited by examiner

Primary Examiner—Michael Mar
(74) Attorney, Agent, or Firm—Foley & Lardner

(57) ABSTRACT

A foldable stroller includes a pair of hollow handle tubes, a pair of front legs, a pair of plungers, and a pair of actuating members. Each handle tube has a lower end with an enlarged portion. Each front leg has an upper end with a rearward enlarged part. When the handle tubes are moved from a first folded position to a first stretched position, the enlarged portion of the respective handle tube moves from a first angular position where it does not overlap with the rearward enlarged part of the respective front leg, to a second angular position where it overlaps with the rearward enlarged part. Each locking member has a hooked portion mounted on the rearward enlarged part of the respective front leg, and a rear hooking portion mounted on the enlarged portion of the respective handle tube. Each plunger has actuated and coupling ends, and a middle portion coupled to the rear hooking portion of the respective locking member. Each actuating member has actuating and linking ends. The linking end is connected to the actuated end of the respective plunger. When the actuating end is forced, the respective plunger will displace so that the middle portion pushes the rear hooking portion to turn and engage or disengage the hooked portion.

8 Claims, 9 Drawing Sheets

FOLDABLE STROLLER

BACKGROUND OF THE INVENTION

1. Field of the Invention

The invention relates to a foldable stroller, more particularly to a foldable stroller that occupies a relatively small amount of space after folding to facilitate storage and transport thereof.

2. Description of the Related Art

Foldable strollers with three wheels are known in the art. FIG. 1 illustrates a conventional foldable stroller 10 which includes a front support frame 11 connected to a handle bar 12, a rear support frame 13, and a base frame 14. The base frame 14 has a front end provided with a front wheel 15, and a rear end provided with a spaced pair of rear wheels 15. The front support frame 11 is provided with a seat member 16 and a foldable canopy 17. The front end of the base frame 14 is formed with a positioning seat 18 which is provided with a spring-loaded positioning pin 19. The front support frame 11 is disposed above the base frame 14, and has a detachable front end connected releasably to the positioning seat 18. With reference to FIGS. 1 and 2, the detachable front end of the front support frame 11 is formed with an insert hole 111 to permit extension of the spring-loaded positioning pin 19 for locking the front end of the front support frame 11 detachably to the base frame 14. The rear support frame 13 has an upper end mounted pivotally to the front support frame 11, and a lower end mounted pivotally to the base frame 14.

Referring to FIGS. 2 and 3, to collapse the conventional stroller 10, the canopy 17 is first folded onto the front support frame 11. The spring-loaded positioning pin 19 is subsequently raised for removal from the insert hole 107 so as to release the front end of the front support frame 11 from the positioning seat 18. The upper end of the rear support frame 13 is then pivoted forwardly relative to the lower end thereof, and the front support frame 11 is pulled forwardly for folding onto the base frame 14. However, it is noted that the folded stroller 10 occupies a large amount of space since the folded stroller 10 still has a relatively long length. Moreover, since the front support frame 11 must be pulled forwardly for folding onto the base frame 14, the section of the front support frame 11 projecting forwardly from the front wheel 15 may create inconvenience during both storage and transport of the stroller 10.

SUMMARY OF THE INVENTION

Therefore, the object of the present invention is to provide a foldable stroller that occupies a relatively small amount of space after folding to facilitate storage and transport thereof.

Accordingly, the foldable stroller of the present invention includes a rear wheel axle, a pair of rear legs, a pair of hollow handle tubes, a front leg frame, a pair of bracing rods, a pair of locking members, a pair of plungers, a pair of actuating members, and a pair of biasing members. The rear wheel axle has two lateral ends that are provided with two rear wheels. The rear legs are disposed to be parallel to and spaced apart from each other in a first axial direction that is parallel to the rear wheel axle. Each rear leg has a lower anchored leg end mounted on a respective one of the lateral ends of the rear wheel axle, and an upper anchored leg end extending upwardly from the lower anchored leg end. The hollow handle tubes are disposed to be parallel to and spaced apart from each other in the first axial direction. Each hollow handle tube defines a tube axis which is transverse to the first axial direction, and has a lower tubular end portion extending along the tube axis, an enlarged portion extending upwardly and in a direction radial to the tube axis from the lower tubular end portion, an upper tubular end portion, and an intermediate tubular section disposed between the upper and lower tubular end portions along the tube axis. The enlarged portion is provided with a forward wall extending in the first axial direction, and a right lateral wall joining the forward wall and facing the first axial direction. The intermediate tubular section is mounted pivotally to the upper anchored leg end of a respective one of the rear legs about the first axial direction and proximate to the lower tubular end portion such that the upper tubular end portion is foldable downwardly and forwardly onto the respective one of the rear legs to place the hollow handle tubes in a first folded position, and is stretchable upwardly and rearwardly from the respective one of the rear legs to place the hollow handle tubes in a first stretched position. The front leg frame includes a front wheel rod which is provided with a front wheel, and a pair of front legs. Each front leg has a lower leg end portion connected to the front wheel rod, an upper leg end portion, and an intermediate leg section therebetween. When the front legs are in a second stretched position, the upper leg end portions thereof extend upwardly, rearwardly and in a first transverse direction parallel to the tube axis. The upper leg end portion of each front leg has a rearward enlarged part with a rearward wall extending in the first axial direction and confronting the forward wall of the enlarged portion of a respective one of the hollow handle tubes in the first transverse direction, and a right lateral section joining the rearward wall and facing the first axial direction. The rearward enlarged part is mounted pivotally to the lower tubular end portion of the respective hollow handle tube at a first pivot point about the first axial direction such that when the hollow handle tubes are moved from the first folded position to the first stretched position, the right lateral wall moves from a first angular position where the right lateral wall does not overlap with the right lateral section, to a second angular position where the right lateral wall overlaps with the right lateral section. Each bracing rod has a rear end which is mounted pivotally to a respective one of the rear legs and proximate to the lower anchored leg end about the first axial direction, and a front end which is mounted pivotally to the intermediate leg section of a respective one of the front legs about the first axial direction such that when the front legs are in a second folded position, the lower leg end portions thereof will be turned about the first axial direction and towards the bracing rods so as to be brought closer thereto for collapsing. Each locking member includes a front hooked portion disposed on the right lateral section of the rearward enlarged part of the upper leg end portion of a respective one of the front legs and extending in the first axial direction, and a rear hooking portion mounted pivotally on the right lateral wall of the enlarged portion of a respective one of the hollow handle tubes at a second pivot point about the first axial direction. The rear hooking portion includes a forcing hooking end and a forced end at opposite sides of the second pivot point. The forcing hooking end is disposed proximate to the front hooked portion. The forced end extends in the radial direction and into the lower tubular end portion of the respective hollow handle tube, and is movable in the first transverse direction. The plungers are disposed in the intermediate tubular sections and extend into the upper tubular end portions of the hollow handle tubes, respectively. Each plunger is movable in the first transverse direction and has actuated and coupling ends opposite to each other in the first transverse direction, and a middle portion interposed therebetween. The actuated end is disposed to extend outwardly of the upper tubular end portion. The coupling end is disposed to be retained at the lower tubular end portion of the respective hollow handle tube, and is slidable in the first transverse direction. The middle portion has a coupling area proximate to the coupling end to couple with the forced end of the rear hooking portion of a respective locking member so as to push the forced end, thereby turning the forcing hooking end of the respective locking member to engage or disengage the front hooked portion when the right lateral wall of the enlarged portion of the respective hollow handle tube is in the second angular position or in the first angular position. Each actuating member is mounted pivotally on the upper tubular end portion of a respective hollow handle tube at a third pivot point about the first axial direction, and has actuating and linking ends at opposite sides of the third pivot point. The linking end is connected to the actuated end of a respective one of the plungers such that when the actuating end is forced, the respective one of the plungers will move in the first transverse direction. The biasing members are disposed to bias the coupling ends of the plungers to move in the first transverse direction and towards the upper tubular end portions of the hollow handle tubes, respectively.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
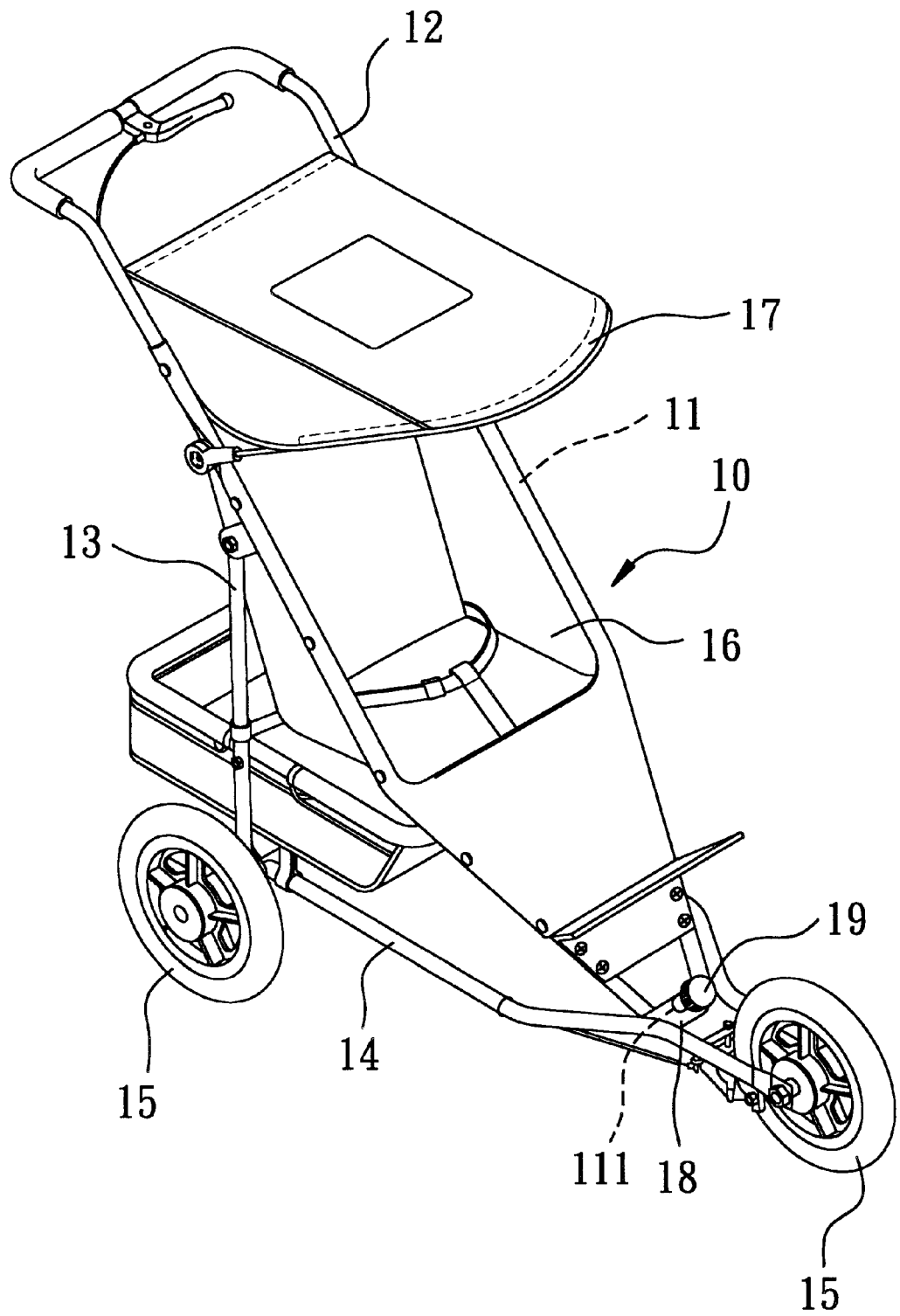
FIG. 1 is a perspective view of a conventional foldable stroller.
Figure 2:
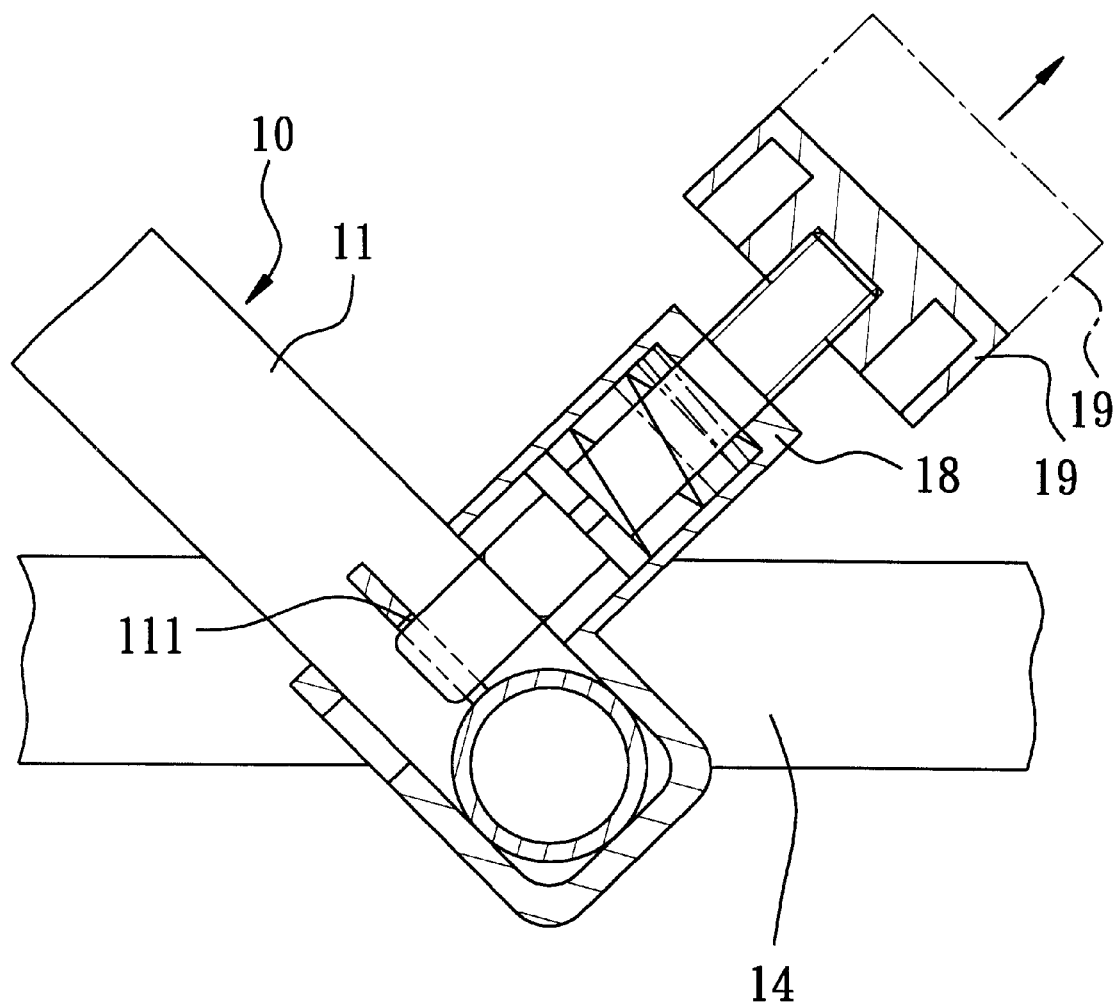
FIG. 2 is a fragmentary partly sectional view of the conventional foldable stroller.
Figure 3:
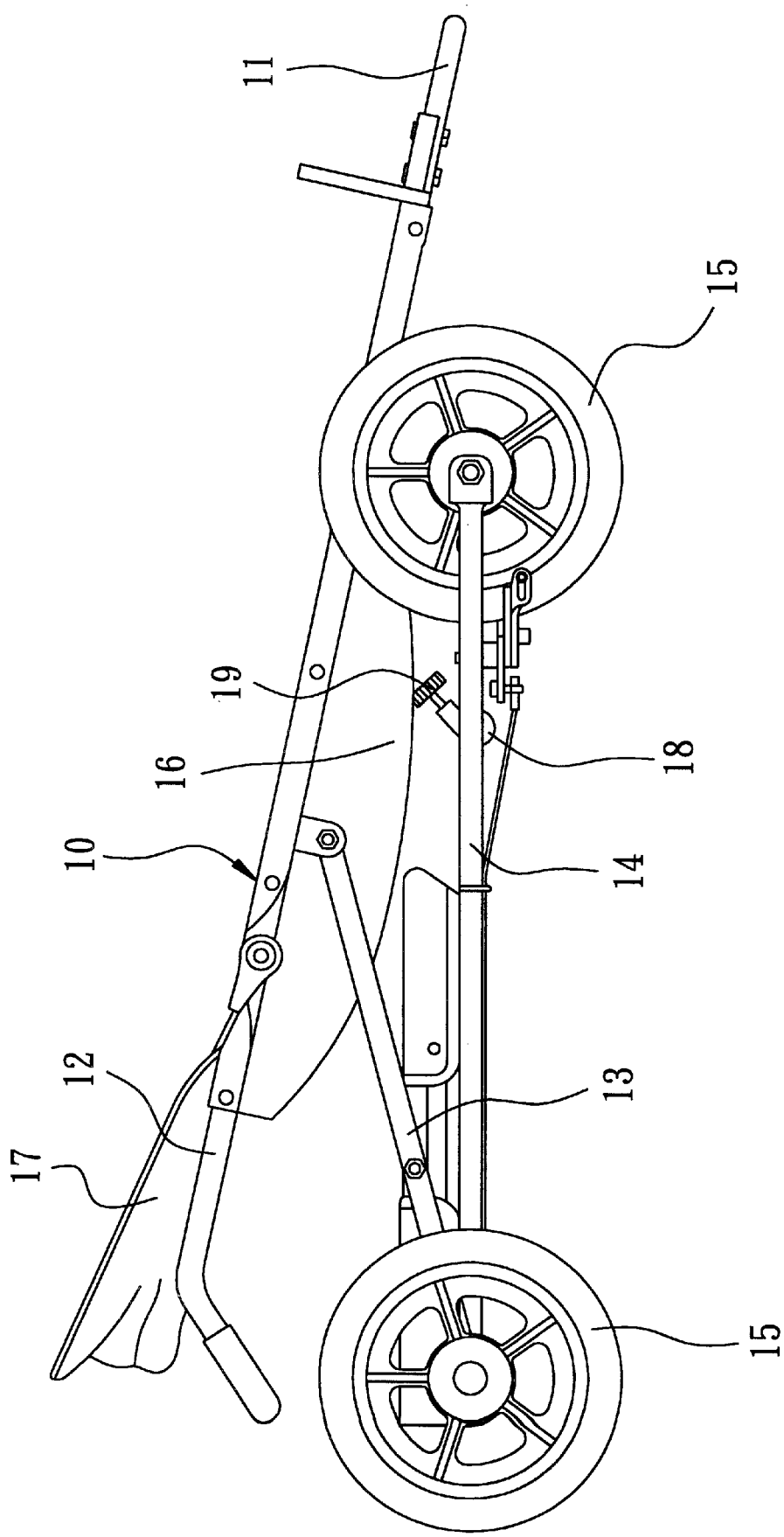
FIG. 3 is a side view illustrating the conventional foldable stroller in a folded state.
Figure 4:
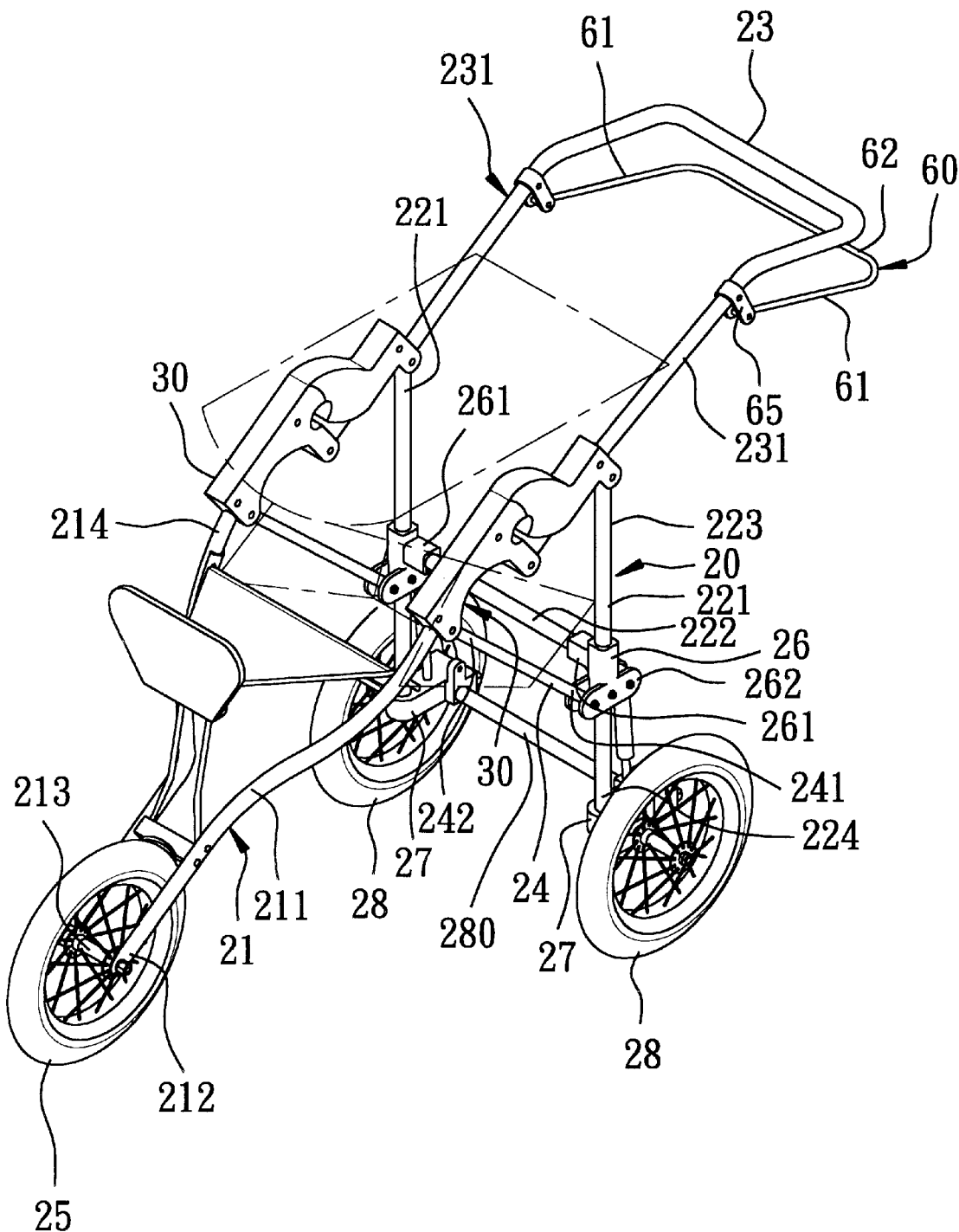
FIG. 4 is a perspective view of a preferred embodiment of a foldable stroller according to the present invention.
Figure 5:
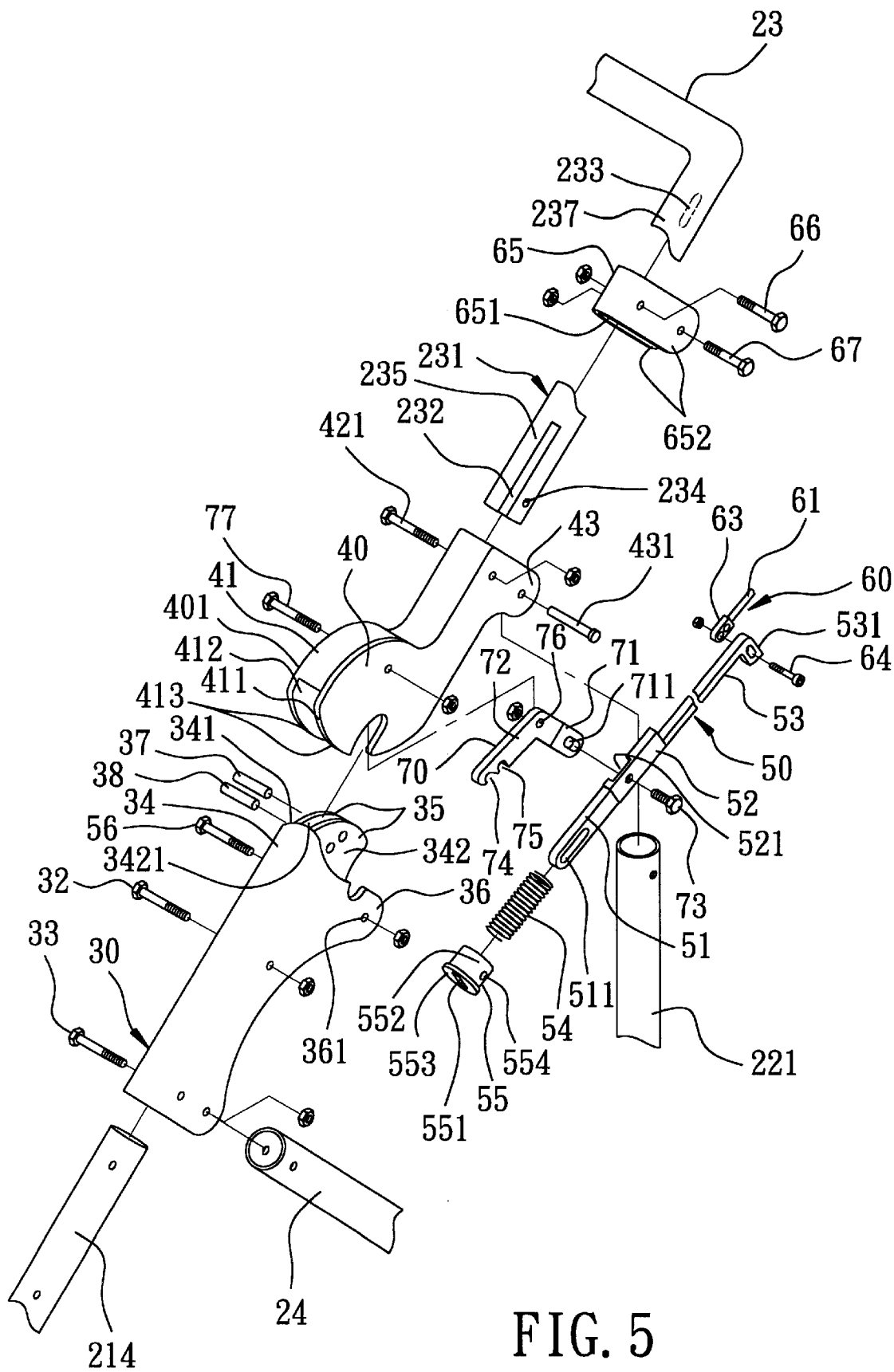
FIG. 5 is an exploded view showing a portion of the foldable stroller of the preferred embodiment.

Referring to FIGS. 4 and 5, the preferred embodiment of a foldable stroller 20 according to the present invention is shown to include a rear wheel axle 280, a pair of rear legs 221, a pair of hollow handle tubes 231, a front leg frame 21, a pair of bracing rods 24, a pair of locking members, a pair of plungers 50, a pair of actuating members 60, and a pair of biasing members 54.

The rear wheel axle 280 has two lateral ends 27 which are provided with two rear wheels 28. The rear legs 221 are disposed to be parallel to and spaced apart from each other in a first axial direction that is parallel to the rear wheel axle 280. Each rear leg 221 has a lower anchored leg end 224 mounted on the respective lateral end 27 of the rear wheel axle 280, and an upper anchored leg end 223 extending upwardly from the lower anchored leg end 224. A connecting seat 26 may be mounted on the respective rear leg 221 between the upper and lower anchored leg ends 223, 224. The connecting seat 26 is provided with an upper connecting portion 261 for receiving one end of a link 222 mounted between the rear legs 221 in the first axial direction, and a lower lateral connecting portion 262 for pivotal connection with the respective bracing rod 24.

Figure 7:
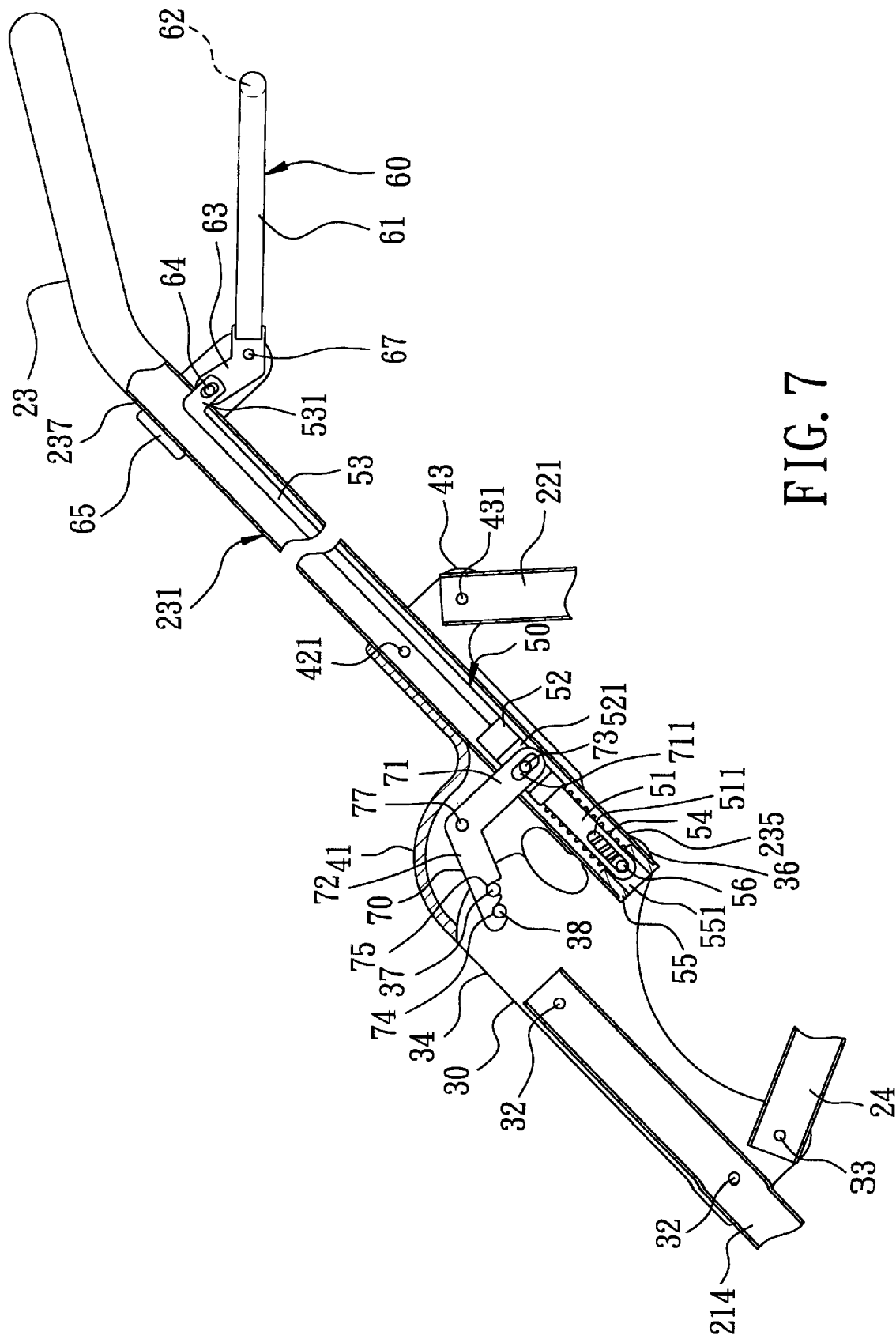
FIG. 7 is a fragmentary partly sectional view of the foldable stroller of the preferred embodiment in the unfolded state.
Figure 8:
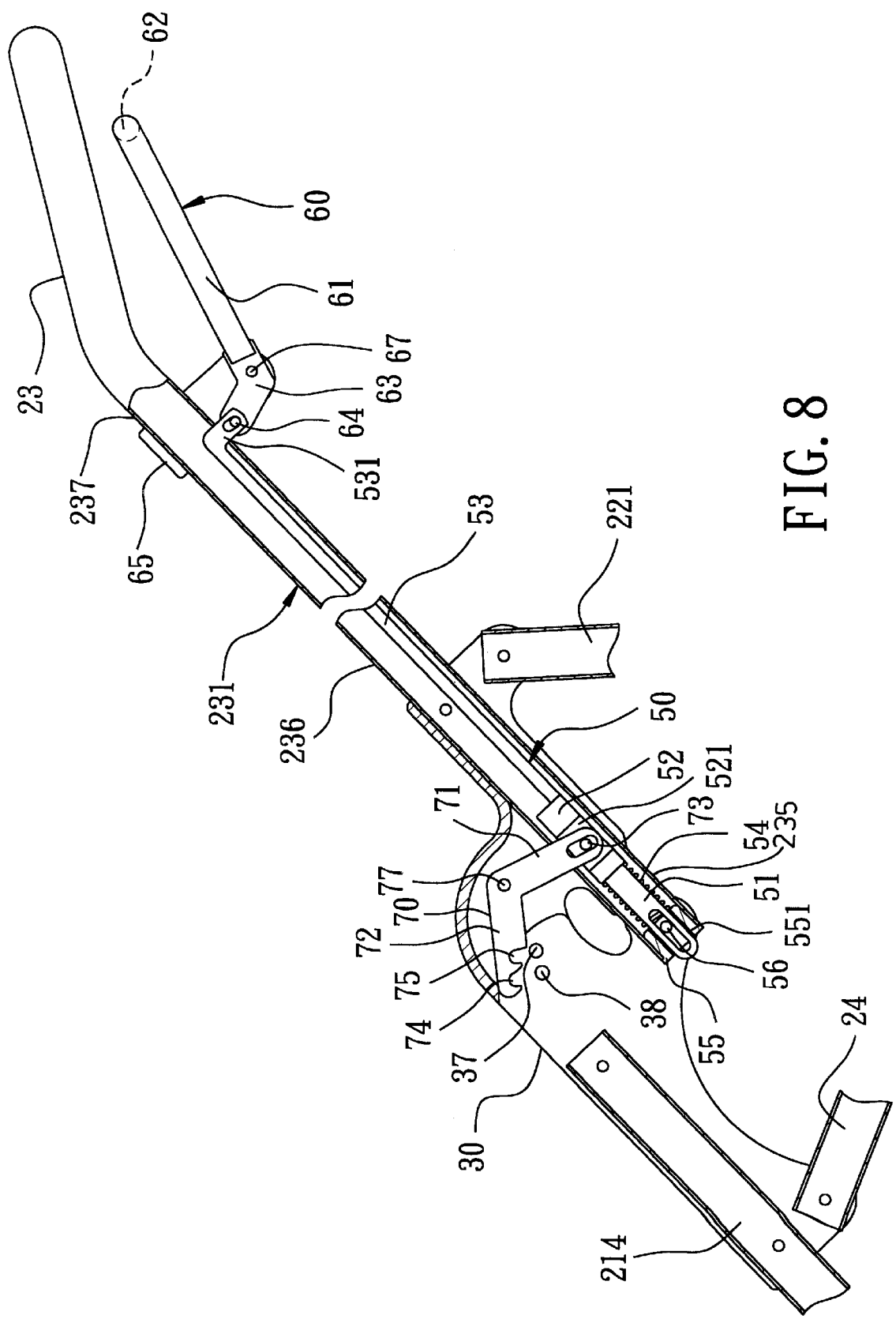
FIG. 8 is a fragmentary partly sectional view of the foldable stroller of the preferred embodiment in a folding state.

The hollow handle tubes 231 are disposed to be parallel to and spaced apart from each other in the first axial direction. Each hollow handle tube 231 defines a tube axis which is transverse to the first axial direction, and has a lower tubular end portion 235 extending along the tube axis, an enlarged portion 41 extending upwardly and in a direction radial to the tube axis from the lower tubular end portion 235, an upper tubular end portion 237, and an intermediate tubular section 236 disposed between the upper and lower tubular end portions 237, 235 along the tube axis. The lower tubular end portion 235 is provided with a pivot pin hole 234 and an axial elongated slot 232 formed in an upper surface thereof, and extends axially through the enlarged portion 41 and is locked therein through the use of a locking element 421. The enlarged portion 41 is provided with a forward wall 411 extending in the first axial direction, and a right lateral wall 40 joining the forward wall 411 and facing the first axial direction. The intermediate tubular section 236 is mounted pivotally to the upper anchored leg end 223 of the respective rear leg 221 about the first axial direction and proximate to the lower tubular end portion 235. As shown in FIGS. 5, 7, and 8, the intermediate tubular section 236 includes a connecting lug 43, and the upper anchored leg end 223 is pivotally connected thereto through the use of a pin 431. As such, the upper tubular end portion 237 is foldable downwardly and forwardly onto the respective rear leg 221 to place the hollow handle tube 231 in a first folded position, and is stretchable upwardly and rearwardly from the respective rear leg 221 to place the hollow handle tube 231 in a first stretched position. In addition, the upper tubular end portion 237 is provided with a slot 233 formed in a lower surface thereof.

The front leg frame 21 includes a front wheel rod 213 which is provided with a front wheel 25, and a pair of front legs 211. Each front leg 211 has a lower leg end portion 212 connected to the front wheel rod 213, an upper leg end portion 30, and an intermediate leg section 214 disposed between the lower and upper leg end portions 212, 30. When the front legs 211 are in a second stretched position, the upper leg end portions 30 thereof extend upwardly, rearwardly and in a first transverse direction parallel to the tube axis. The upper leg end portion 30 has a rearward enlarged part 34 with a rearward wall 341 extending in the first axial direction and confronting the forward wall 411 of the enlarged portion 41 of the respective hollow handle tube 231 in the first transverse direction, and a right lateral section 342 joining the rearward wall 341 and facing the first axial direction. The rearward enlarged part 34 includes a lower locking lug 36 provided with a pivot pin hole 361, and is mounted pivotally to the lower tubular end portion 235 of the respective hollow handle tube 231 at a first pivot pin 56 about the first axial direction. The first pivot pin 56 is disposed in and extends radial to the lower tubular end portion 235 and distal to the intermediate tubular section 236. As such, when the hollow handle tubes 231 are moved from the first folded position to the first stretched position, the right lateral wall 40 moves from a first angular position where the right lateral wall 40 does not overlap with the right lateral section 342, to a second angular position where the right lateral wall 40 overlaps with the right lateral section 342. The upper leg end portion 30 may be formed with an insert hole extending in the first transverse direction, and one end of the respective intermediate leg section 214 may be inserted into the insert hole and locked therein through the use of locking elements 32.

In addition, with reference to FIG. 5, the enlarged portion 41 of each hollow handle tube 231 has a left lateral wall 401 opposite to the right lateral wall 40 in the first axial direction. The right and left lateral walls 40, 401 form right and left sweeping lug portions 413 spaced apart from each other in the first axial direction to define an accommodating space 412 which extends in the first transverse direction to be communicated with the forward wall 341. In addition, the rearward enlarged part 34 of the upper leg end portion 30 of each front leg 211 has a left lateral section 3421 opposite to the right lateral section 342 in the first axial direction. The right and left lateral sections 342, 3421 form right and left swept lug portions 35 that are spaced apart from each other in the first axial direction, and that are respectively disposed inboard to the right and left sweeping lug portions 413 when the right and left sweeping lug portions 413 are in the second angular position.

Each bracing rod 24 has a rear end 241 which is mounted pivotally to the respective rear leg 221 and proximate to the lower anchored leg end 224 about the first axial direction, and a front end 242 which is mounted pivotally to the intermediate leg section 214 of a respective one of the front legs 211 about the first axial direction through the use of a locking element 33. As such, when the front legs 211 are in a second folded position, the lower leg end portion 212 of the respective front leg 211 will be turned about the first axial direction and towards the bracing rods 24 so as to be brought closer thereto for collapsing.

Each locking member includes a front hooked portion disposed on the right lateral section 342 of the rearward enlarged part 34 of the respective front leg 211 and extending in the first axial direction, and a rear hooking portion 70 mounted pivotally on the right lateral wall 40 of the enlarged portion 41 of the respective hollow handle tube 231 at a second pivot pin 77 about the first axial direction. The rear hooking portion 70 is generally L-shaped and includes a forcing hooking end 72 and a forced end 71 at opposite sides of the second pivot point 77. The forcing hooking end 72 is disposed proximate to the front hooked portion. The forced end 71 extends in the radial direction and into the lower tubular end portion 235 of the respective hollow handle tube 231, and is movable in the first transverse direction. The forcing hooking end 72 has proximate and distal hooking notches 75, 74 disposed relative to the second pivot pin 77. In the preferred embodiment, the front hooked portion includes a pair of hooked pins 37, 38 respectively extending in the first axial direction and secured to and disposed between the right and left swept lug portions 35, respectively, such that when the right and left sweeping lug portions 413 are in the second angular position, the proximate and distal hooking notches 75, 74 engage the hooked pins 37, 38, respectively. In addition, the forced end 71 is provided with an elongated slot 711. The rear hooking portion 70 further has a pivot pin hole 76 disposed between the forcing hooking end 72 and the forced end 71, and is pivotally mounted on the right lateral wall 40 by passing the second pivot pin 77 through the pin hole 76 such that the forcing hooking end 72 extends outwardly of the upper surface of the lower tubular end portion 235 through the elongated slot 232 and towards the upper leg end portion 30.

The plungers 50 are disposed in the intermediate tubular sections 236 and extend into the upper tubular end portions 237 of the hollow handle tubes 231, respectively. Each plunger 50 is movable in the first transverse direction and has actuated and coupling ends 53, 51 opposite to each other in the first transverse direction, and a middle portion 52 interposed therebetween. The actuated end 53 includes an angular locking block 531 which is provided with a pin hole, and extends outwardly of the slot 233 in the lower surface of the upper tubular end portion 237. The coupling end 51 is disposed to be retained at the lower tubular end portion 235 of the respective hollow handle tube 231, and is slidable in the first transverse direction. The middle portion 52 has a coupling area 521 proximate to the coupling end 51 to couple with the forced end 71 of the rear hooking portion 70 of the respective locking member, through the use of a locking element 73 passing through the coupling area 521 and the elongated slot 711 in the forced end 71, so as to push the forced end 71, thereby turning the forcing hooking end 72 of the rear hooking portion 70 of the respective locking member to engage or disengage the front hooked portion 37, 38 when the right lateral wall 40 of the respective hollow handle tube 231 is in the second angular position or in the first angular position. The coupling end 51 has a keyway 511 extending in the first transverse direction. Each plunger 50 further includes a cap 55 which is provided with an end face 553, a through slot 551 extending through the end face 553 in a second transverse direction, a cylindrical cap body 552, and opposite locking holes 554 extending in the first axial direction. The cylindrical cap body 552 is located at a distal end of the lower tubular end portion 235 of the respective hollow handle tube 231, with the end face 553 covering a distal end face of the lower tubular end portion 235. The first pivot pin 56 passes through the locking hole 361 in the locking lug 36 of the rearward enlarged part 34, the pivot pin hole 234 in the lower tubular end portion 235, the locking holes 554 in the cap 55, and the keyway 511 in the coupling end 51 to thereby couple pivotally the front legs 211, the hollow handle tubes 231, and the plungers 50. As such, the first pivot pin 56 also serves as a key to regulate movement of the lower tubular end portion 235 along the tube axis.

Each actuating member 60 is mounted pivotally on the upper tubular end portion 237 of the respective hollow handle tube 231 at a third pivot pin 67 about the first axial direction, and has actuating and linking ends 61, 63 at opposite sides of the third pivot pin 67. Referring to FIGS. 5, 7, and 8, the linking end 63 has a distal end locked to the locking block 531 of the actuated end 53 of the respective plunger 50 through the use of a locking element 64. A generally U-shaped locking bracket 65 is mounted on the upper tubular end portion 237 of the respective hollow handle tube 231 with the use of a locking element 66. The locking bracket 65 has two downwardly extending side plates 652 that define a curved opening 651. The linking end 63 is mounted pivotally between the side plates 652 by passing the third pivot pin 67 through a proximate end of the linking end 63 and the side plates 652. As such, when the actuating end 61 is forced, the respective plunger 50 will move in the first transverse direction.

The biasing members 54 are disposed to bias the coupling ends 51 of the plungers 50 to move in the first transverse direction and towards the upper tubular end portions 237 of the hollow handle tubes 231. In the preferred embodiment, the biasing members 54 are coil springs, each of which is sleeved on the coupling end 51 of the respective plunger 50, and has two ends abutting against the cylindrical cap body 552 of the cap 55 and the middle portion 52 of the respective plunger 50, respectively. When the forced end 71 of the rear hooking portion 70 is pushed by virtue of movement of the middle portion 52 of the respective plunger 50 against biasing action of the respective biasing member 54, the coupling end 51 extends through the through slot 551, and the distal hooking notches 74, 75 disengage the hooked pins 37, 38, thereby permitting the upper tubular end portion 237 to displace downwardly to the first folded position.

To facilitate manipulation, the foldable stroller 20 may further include a handle bar 23 having two ends opposite to each other in the first axial direction and respectively connected to the upper tubular end portions 237 of the hollow handle tubes 231, and a connecting rod 62 having two ends opposite to each other in the first axial direction and transversely connected to the actuating ends 61 of the actuating members 60, respectively.

Figure 6:
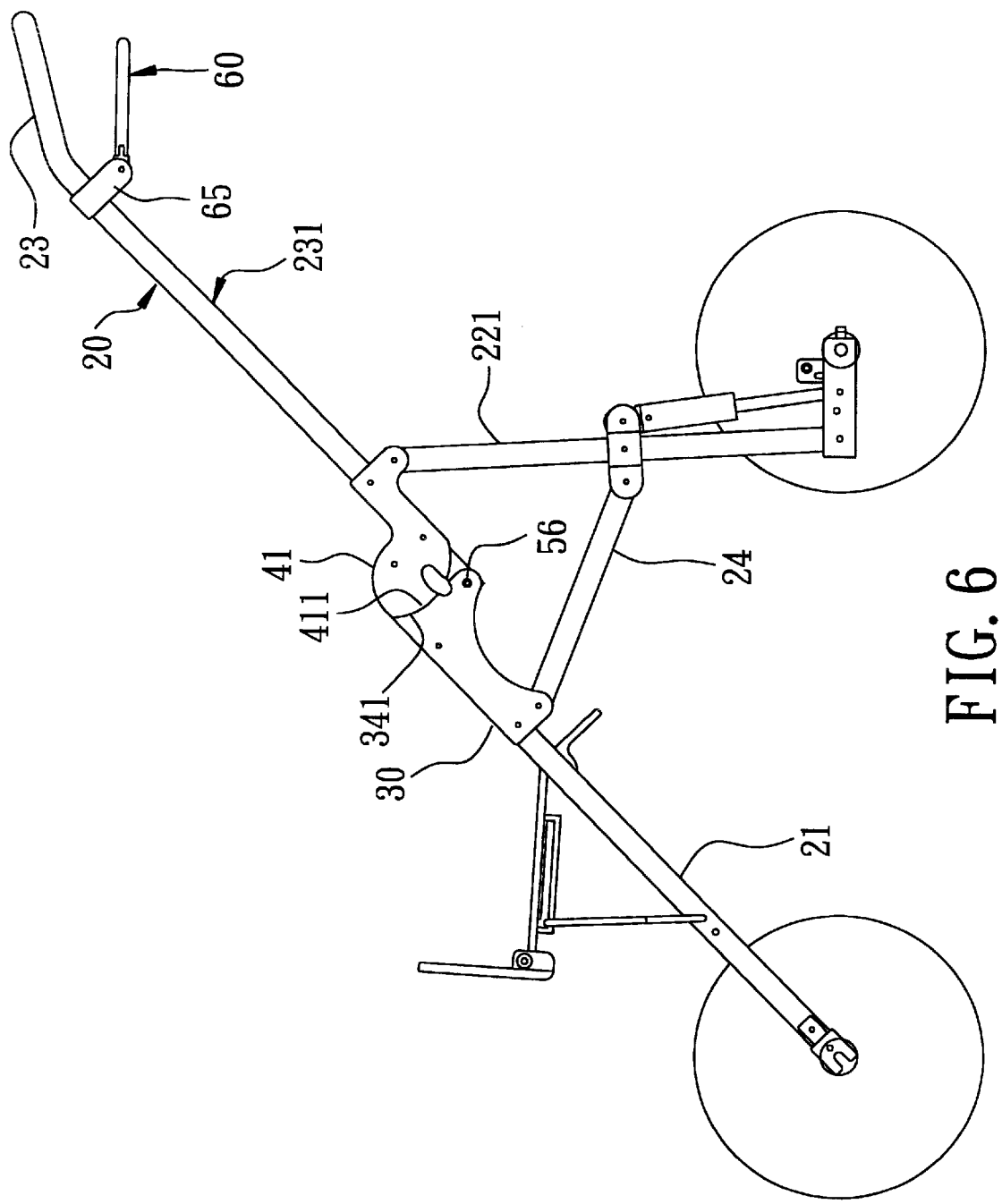
FIG. 6 is a schematic side view of the foldable stroller of the preferred embodiment in an unfolded state.

With reference to FIGS. 4, 6, and 7, which illustrate the foldable stroller 20 of the present invention in an unfolded state, the right lateral wall 40 overlaps with the right lateral section 342, and the forcing hooking end 72 of the rear hooking portion 70 extends into and is located between the right and left swept lug portions 35, with the proximate and distal hooking notches 75, 74 engaging the hooked pins 37, 38, respectively. At this time, the front leg frame 21 and the rear legs 221 are stretched by means of the bracing rods 24.

Figure 9:
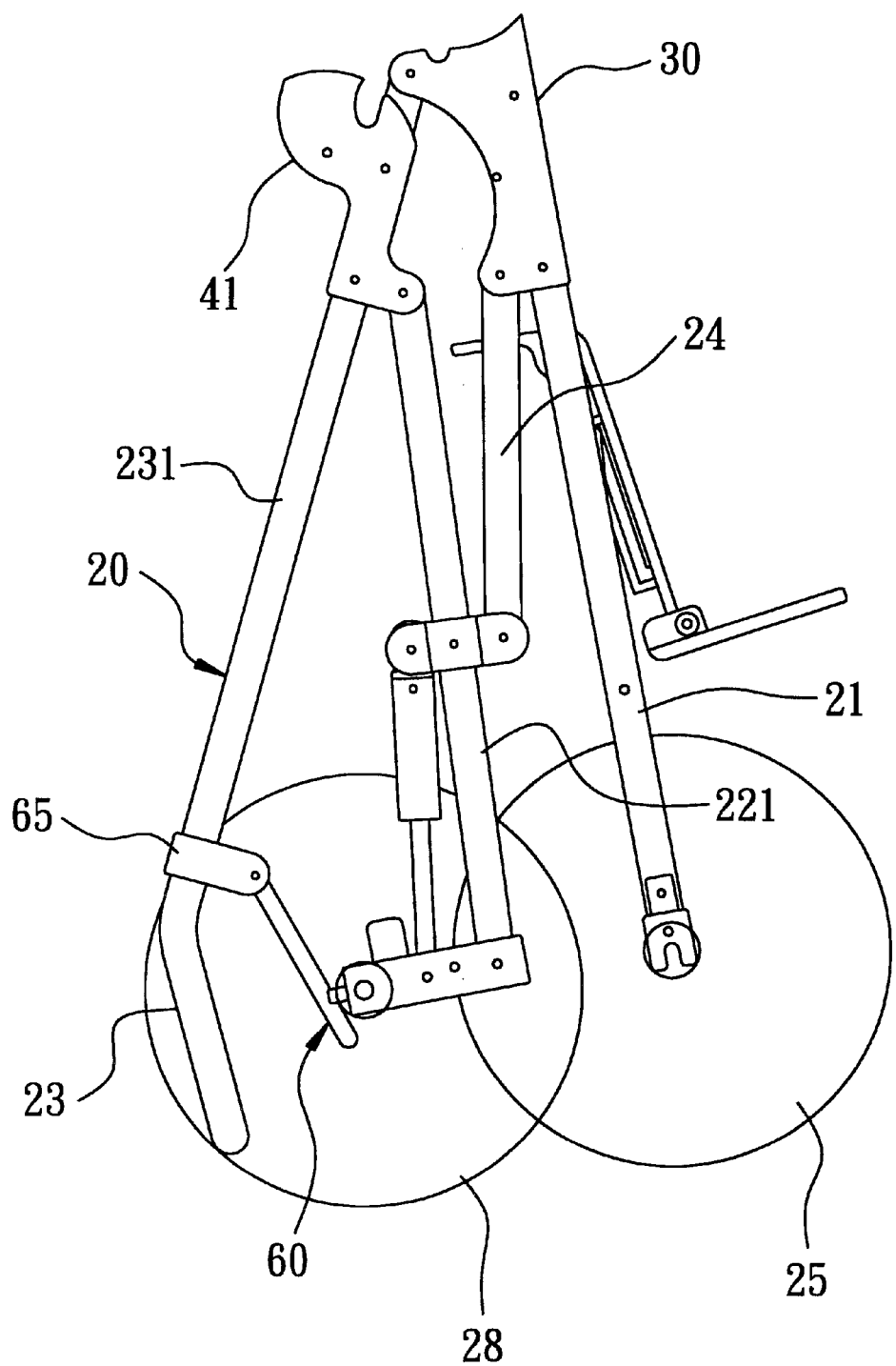
FIG. 9 is a schematic view of the foldable stroller of the preferred embodiment in a folded state.

Referring to FIG. 8, when it is desired to collapse the foldable stroller 20, the user only needs to grip the handle bar 23 and pull the connecting rod 62 towards the handle bar 23, whereby the linking end 63 of each actuating member 60 will rotate about the respective third pivot pin 67 and displace downwardly, i.e., towards the lower tubular end portion 235 of the hollow handle tube 231. At this point, each plunger 50 will displace downwardly, while the coupling area 521 of the middle portion 52 thereof causes the forced end 71 of the rear hooking portion 70 to displace downwardly and towards the lower tubular end portion 235. As a result, the rear hooking portion 70 will rotate about the third pivot pin 77, while the forcing hooking end 72 thereof rotates upwardly relative thereto, thereby causing the distal and proximate hooking notches 74, 75 to disengage from the hooked pins 38, 37. Thereafter, it is only necessary to press the handle bar 23 downwardly so that the hollow handle tube 231 rotates pivotally about the pin 431 to bring the enlarged portion 41 to tilt upwardly, while the actuating end 61 moves towards the rear leg 221. At the same time, the angle between the hollow handle tube 231 and the front leg assembly 21 at their pivot joint changes, and all of the front leg frame 21, the hollow handle tubes 231, the rear legs 221, and the bracing rods 24 are hence moved towards one another to a folded state, such as that shown in FIG. 9.

In addition, since the plunger 50 displaces downwardly when the connecting rod 62 is pressed towards the handle bar 23, the distance between the middle portion 52 and the cylindrical cap body 552 is shortened, and the biasing member 54 disposed therebetween is compressed. Therefore, when the connecting rod 62 is released, due to the biasing action of the biasing members 54, the plungers 50, together with the front leg frame 21, the hollow handle tubes 231, the rear legs 221, and the bracing rods 24, will return to their original positions. As such, in use, when the handle bar 23 of the foldable stroller 20 is pulled upwardly, it is only necessary to press the connecting rod 62 to cause the forcing hooking end 72 of the rear hooking portion 70 to displace upwardly, and then release the connecting rod 62 so that the forcing hooking end 72 of the rear hooking portion 70 will, against the biasing action of the respective biasing member 70, displace downwardly to cause the distal and proximate hooking notches 74, 75 to engage the hooked pins 38, 37, thereby positioning firmly the hollow handle tubes 231 and the front leg frame 21.

In view of the foregoing, it can be appreciated that the foldable stroller 20 of the present invention is easy to operate, and the overall length and profile thereof can be reduced to facilitate storage and transport. Moreover, in operation, the distal hooking notch 74 is caused to engage the hooked pin 37 first to place the relevant components of the foldable stroller 20 in a first-stage locking state so as to avoid clamping the user's fingers. When the enlarged portion 41 and the rearward enlarged part 34 overlap, the connecting rod 62 is released to permit the distal and proximate hooking notches 74, 75 to engage the hooked pins 38, 37 to strengthen the locking effect. Hence, the foldable stroller 20 of the present invention is safe to use.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A foldable stroller comprising:

a rear wheel axle with two lateral ends which are provided with two rear wheels;

a pair of rear legs disposed to be parallel to and spaced apart from each other in a first axial direction that is parallel to said rear wheel axle, each of said rear legs having a lower anchored leg end mounted on a respective one of said lateral ends of said rear wheel axle, and an upper anchored leg end extending upwardly from said lower anchored leg end;

a pair of hollow handle tubes disposed to be parallel to and spaced apart from each other in the first axial direction, each of said hollow handle tubes defining a tube axis which is transverse to the first axial direction, and having a lower tubular end portion extending along the tube axis, an enlarged portion extending upwardly and in a direction radial to the tube axis from said lower tubular end portion, and provided with a forward wall extending in the first axial direction, and a right lateral wall joining said forward wall and facing the first axial direction, an upper tubular end portion, and an intermediate tubular section disposed between said upper and lower tubular end portions along the tube axis, and mounted pivotally to said upper anchored leg end of a respective one of said rear legs about the first axial direction and proximate to said lower tubular end portion such that said upper tubular end portion is foldable downwardly and forwardly onto the respective one of said rear legs to place said hollow handle tubes in a first folded position, and is stretchable upwardly and rearwardly from the respective one of said rear legs to place said hollow handle tubes in a first stretched position;

a front leg frame including a front wheel rod which is provided with a front wheel, and a pair of front legs, each of said front legs having a lower leg end portion connected to said front wheel rod, an upper leg end portion which, when said front legs are in a second stretched position, extends upwardly, rearwardly and in a first transverse direction parallel to the tube axis, and which has a rearward enlarged part with a rearward wall extending in the first axial direction and confronting said forward wall of said enlarged portion of a respective one of said hollow handle tubes in the first transverse direction, and a right lateral section joining said rearward wall and facing the first axial direction, said rearward enlarged part being mounted pivotally to said lower tubular end portion of the respective one of said hollow handle tubes at a first pivot point about the first axial direction such that when said hollow handle tubes are moved from the first folded position to the first stretched position, said right lateral wall moves from a first angular position where said right lateral wall does not overlap with said right lateral section, to a second angular position where said right lateral wall overlaps with said right lateral section, and an intermediate leg section disposed between said lower and upper leg end portions;

a pair of bracing rods, each having a rear end which is mounted pivotally to a respective one of said rear legs and proximate to said lower anchored leg end about the first axial direction, and a front end which is mounted pivotally to said intermediate leg section of a respective one of said front legs about the first axial direction such that when said front legs are in a second folded position, said lower leg end portion of the respective one of said front legs will be turned about the first axial direction and towards said bracing rods so as to be brought closer thereto for collapsing;

a pair of locking members, each including a front hooked portion disposed on said right lateral section and extending in the first axial direction, and a rear hooking portion mounted pivotally on said right lateral wall of said enlarged portion of a respective one of said hollow handle tubes at a second pivot point about the first axial direction, said rear hooking portion including a forcing hooking end and a forced end at opposite sides of the second pivot point, said forcing hooking end being disposed proximate to said front hooked portion, said forced end extending in the radial direction and into said lower tubular end portion of the respective one of said hollow handle tubes, and being movable in the first transverse direction;

a pair of plungers, each disposed in said intermediate tubular section of a respective one of said hollow handle tubes and extending into said upper tubular end portion of the respective one of said hollow handle tubes, each of said plungers being movable in the first transverse direction and having actuated and coupling ends opposite to each other in the first transverse direction and a middle portion interposed therebetween, said actuated end being disposed to extend outwardly of said upper tubular end portion, said coupling end being disposed to be retained at said lower tubular end portion of the respective one of said hollow handle tubes and being slidable in the first transverse direction, said middle portion having a coupling area proximate to said coupling end to couple with said forced end of said rear hooking portion of a respective one of said locking members so as to push said forced end, thereby turning said forcing hooking end of said rear hooking portion of the respective one of said locking members to engage or disengage said front hooked portion when said right lateral wall of said enlarged portion of the respective one of said hollow handle tubes is in the second angular position or in the first angular position;

a pair of actuating members, each mounted pivotally on said upper tubular end portion of a respective one of said hollow handle tubes at a third pivot point about the first axial direction, and having actuating and linking ends at opposite sides of the third pivot point, said linking end being connected to said actuated end of a respective one of said plungers such that when said actuating end is forced, the respective one of said plungers will move in the first transverse direction; and a pair of biasing members, each biasing said coupling end of a respective one of said plungers to move in the first transverse direction and towards said upper tubular end portion of the respective one of said hollow handle tubes.

2. A foldable stroller according to claim 1, wherein:

said enlarged portion of each of said hollow handle tubes has a left lateral wall opposite to said right lateral wall in the first axial direction, said right and left lateral walls forming right and left sweeping lug portions spaced apart from each other in the first axial direction to define an accommodating space which extends in the first transverse direction to be communicated with said forward wall; and said rearward enlarged part of said upper leg end portion of each of said front legs has a left lateral section opposite to said right lateral section in the first axial direction, said right and left lateral sections forming right and left swept lug portions spaced apart from each other in the first axial direction and disposed inboard to said right and left sweeping lug portions, respectively, when said right and left sweeping lug portions are in the second angular position.

3. A foldable stroller according to claim 2, wherein:

said forcing hooking end has proximate and distal hooking notches disposed relative to the second pivot point; and said front hooked portion includes a pair of hooked pins respectively extending in the first axial direction and secured to and disposed between said right and left swept lug portions, respectively, such that when said right and left sweeping lug portions are in the second angular position, said proximate and distal hooking notches engage said hooked pins, respectively.

4. A foldable stroller according to claim 3, wherein said distal hooking notch is disposed to sequentially engage said hooked pins while said forced end is being pushed by virtue of movement of said middle portion of the respective one of said plungers against biasing action of the respective one of said biasing members, and while said upper tubular end portion displaces upwardly from the first folded position towards the first stretched position.

5. A foldable stroller according to claim 1, wherein said biasing members are coil springs, each sleeved on said coupling end of the respective one of said plungers.

6. A foldable stroller according to claim 1, further comprising a key disposed in and extending radial to said lower tubular end portion and distal to said intermediate tubular section, said coupling end having a keyway that extends in the first transverse direction to receive said key in the respective one of said hollow handle tubes so as to regulate movement of said lower tubular end portion along the tube axis.

7. A foldable stroller according to claim 1, further comprising a handle bar having two ends opposite to each other in the first axial direction and respectively connected to said upper tubular end portions of said hollow handle tubes.

8. A foldable stroller according to claim 7, further comprising a connecting rod having two ends opposite to each other in the first axial direction and transversely connected to said actuating ends of said actuating members, respectively.

* * * * *